United States Patent
Cheng et al.

(10) Patent No.: US 11,729,248 B2
(45) Date of Patent: Aug. 15, 2023

(54) WEB APPLICATION COMPONENT MIGRATION TO A CLOUD COMPUTING SYSTEM

(71) Applicant: MICROSOFT TECHNOLOGY LICENSING, LLC, Redmond, WA (US)

(72) Inventors: Long Cheng, Redmond, WA (US); Simon Bourdages, Redmond, WA (US); Lei Cao, Redmond, WA (US); Kangle Yu, Redmond, WA (US); Zhigang Zhang, Redmond, WA (US); Huan Wang, Redmond, WA (US); Jian He, Redmond, WA (US); Wen Zhou, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/775,566

(22) PCT Filed: Nov. 7, 2019

(86) PCT No.: PCT/CN2019/116241
§ 371 (c)(1),
(2) Date: May 9, 2022

(87) PCT Pub. No.: WO2021/087858
PCT Pub. Date: May 14, 2021

(65) Prior Publication Data
US 2022/0407907 A1      Dec. 22, 2022

(51) Int. Cl.
*H04L 67/02*        (2022.01)
*H04L 67/10*        (2022.01)

(52) U.S. Cl.
CPC ............. *H04L 67/02* (2013.01); *H04L 67/10* (2013.01)

(58) Field of Classification Search
None
See application file for complete search history.

(56) References Cited

U.S. PATENT DOCUMENTS

| 8,990,809 B1 | 3/2015 | Jacob et al. |
| 9,825,881 B2 | 11/2017 | Johnston et al. |

(Continued)

FOREIGN PATENT DOCUMENTS

| AU | 2017200642 A1 | 2/2017 |
| CN | 108667925 A | 10/2018 |

OTHER PUBLICATIONS

Cai, et al., "Refactor Existing Monolithic Applications to Microservices One Bite at a Time, Part 2: Migrating the Cloud Application", Retrieved from: https://web.archive.org/web/20190503044619/https://developer.ibm.com/tutorials/refactor-existing-monolithic-applications-to-microservices-one-bite-at-a-time-part-2/, Sep. 19, 2017, 39 Pages.

(Continued)

*Primary Examiner* — Quang N Nguyen
(74) *Attorney, Agent, or Firm* — Scott Y. Shigeta; Newport IP, LLC (57) ABSTRACT

Systems and method for migrating a web application from a source environment to a cloud service. A cloud service system accesses a temporary container containing a manifest and a plurality of web parts for the web application. The manifest includes a list of contents of the temporary container and defines an appearance and functionality of the web application. The cloud service system then reconstructs the web application on the cloud service by automatically generating a user interface environment for the web application on the cloud service based on the manifest and importing each web part of the web parts to the cloud service. The cloud service system configures each web part and the user interface environment to interact as defined by the manifest. The user interface environment reconstructed (Continued)

on the cloud service replicates the appearance and functionality of the web application operating system in the source environment.

13 Claims, 6 Drawing Sheets

(56) References Cited

U.S. PATENT DOCUMENTS

| | | | |
|---|---|---|---|
| 10,326,826 B1 | 6/2019 | Fitzgerald et al. | |
| 2011/0265164 A1 | 10/2011 | Lucovsky et al. | |
| 2014/0082479 A1 | 3/2014 | Guinane | |
| 2014/0156958 A1 | 6/2014 | Dow et al. | |
| 2014/0196022 A1 | 7/2014 | Skutin et al. | |
| 2014/0351372 A1 | 11/2014 | Xu et al. | |
| 2016/0034302 A1 | 2/2016 | Fries et al. | |
| 2016/0077869 A1* | 3/2016 | Grueneberg | H04L 67/10 718/1 |
| 2016/0373289 A1 | 12/2016 | Hernandez et al. | |
| 2018/0246886 A1 | 8/2018 | Dragomirescu et al. | |
| 2018/0309747 A1* | 10/2018 | Sweet | G06F 9/45558 |
| 2018/0336027 A1 | 11/2018 | Narayanan et al. | |
| 2019/0179720 A1* | 6/2019 | Chen | G06F 11/203 |
| 2019/0243687 A1* | 8/2019 | Chen | G06F 9/455 |
| 2019/0324786 A1 | 10/2019 | Ranjan et al. | |
| 2021/0232439 A1* | 7/2021 | Fong | H04L 67/02 |
| 2022/0131852 A1* | 4/2022 | Sharma | H04L 63/0815 |

OTHER PUBLICATIONS

Hendrickson, et al., "How the SharePoint Migration Tool Works", Retrieved from: https://docs.microsoft.com/en-us/sharepointmigration/how-the-sharepoint-migration-tool-works, Jul. 23, 2019, 3 Pages.

"International Search Report & Written Opinion Issued in PCT Application No. PCT/CN2019/116241", dated Aug. 6, 2020, 9 Pages.

Varia, Jinesh, "Migrating your Existing Applications to the AWS Cloud", In White Paper of Amazon Web Services, Oct. 2010, 23 Pages.

"Extended Search Report Issued in European Patent Application No. 199516091", dated April 17, 2023, 12 Pages.

* cited by examiner

WEB APPLICATION COMPONENT MIGRATION TO A CLOUD COMPUTING SYSTEM

This application is a National Phase entry of International Application No. PCT/CN2019/116241, filed Nov. 7, 2019; the entire disclosures of the patent application is incorporated herein by reference.

FIELD

Embodiments described herein relate to systems and methods for migrating a web-based application to a cloud-computing service environment.

SUMMARY

Moving web applications components to a cloud-computing system can be expensive and tedious often requiring a large number of separate API ("Application Programming Interface") calls to ensure that all components are migrated appropriately to the new environment. Also, because the a web application can include components and meta data stored on multiple different devices including web servers and a local computer, the appearance and functionality of the web application can vary depending on the location from which the web application is access. Accordingly, a web application may appear to have a different look-and-feel to a user after migration to the cloud-computing environment.

In some implementations, the systems and methods described below provide a mechanism for importing all web application components to a cloud-computing system destination in a single API call. In some such implementations, an agent computer system analyzes the source content (i.e., the web application miming in its current environment) and generates a manifest that summarizes all of the components of the web application and other data that affects the appearance and function of the web application. The manifest and all of the identified components of the web application are then included in a migration container (e.g., a temporary container) that is uploaded to a cloud system storage. When the cloud-computing system receives an API call requesting migration, the cloud-computing system accesses the migration container, reads the manifest, and then proceeds to asynchronously reconstruct the web application in the cloud-computing environment based on the manifest. After migration is complete and the web application has been reconstructed in the cloud-computing environment, the cloud-computing system transmits a response to the API call.

In one implementation, this disclosure provides a method for migrating a web application from a source environment to a cloud service. A cloud service system accesses a temporary container containing a manifest and a plurality of web parts for the web application. Each web part of the plurality of web parts is a software component that generates web-based content for the web application during operation of the web application. The manifest includes a list of contents of the temporary container and defines an appearance and functionality of the web application operating in the source environment. The cloud service system then reconstructs the web application on the cloud service by automatically generating a user interface environment for the web application on the cloud service based on the manifest and importing each web part of the web parts to the cloud service. The cloud service system configures each web part and the user interface environment to interact as defined by the manifest. The user interface environment reconstructed on the cloud service replicates the appearance and functionality of the web application operating system in the source environment.

In another implementation, this disclosure provides a web application migration system. The system includes a cloud service system configured to access a temporary container containing a manifest and a plurality of web parts for a web application. Each web part of the plurality of web parts is a software component that generates web-based content for the web application during operation of the web application. The manifest includes a list of contents of the temporary container and defines an appearance and functionality of the web application operating in a source environment. The cloud service system then reconstructs the web application on the cloud service by automatically generating a user interface environment for the web application on the cloud service based on the manifest and importing each web part of the web parts to the cloud service. The cloud service system configures each web part and the user interface environment to interact as defined by the manifest. The user interface environment reconstructed on the cloud service replicates the appearance and functionality of the web application operating system in the source environment.

These and other features, aspects, and advantages will be apparent from a reading of the following detailed description and a review of the associated drawings. It is to be understood that both the foregoing general description and the following detailed description are explanatory and do not restrict aspects as claimed.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
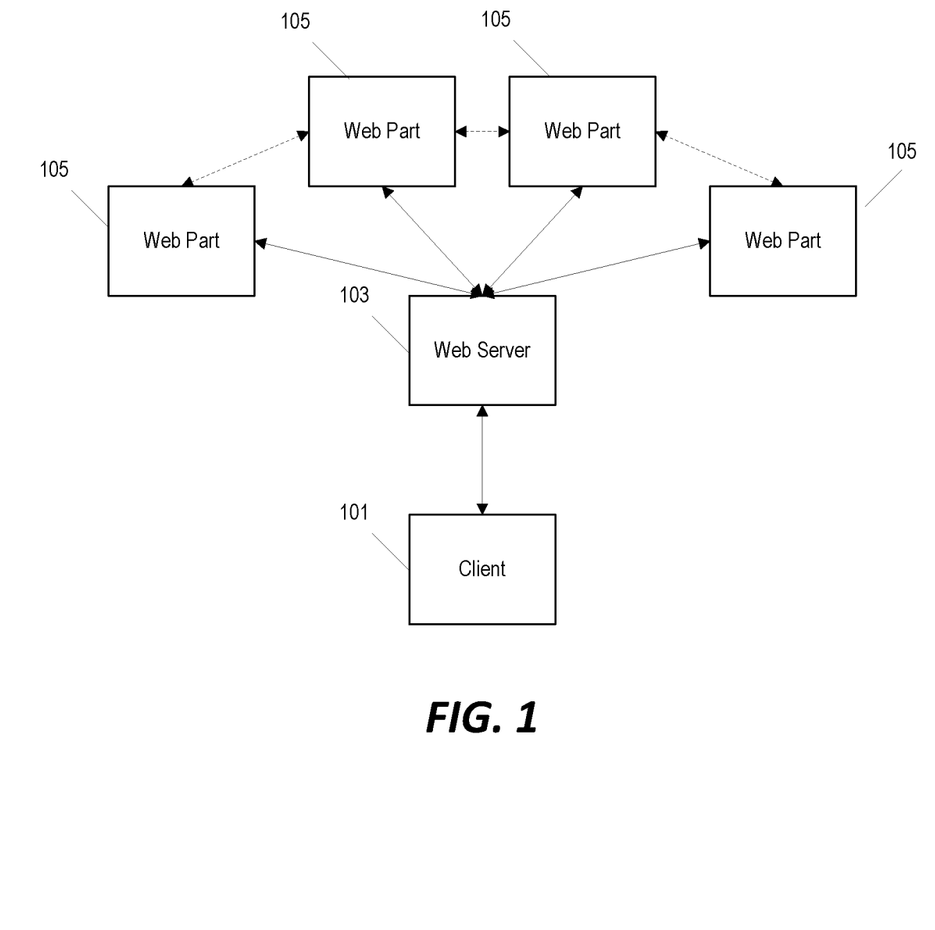
FIG. 1 is a block-diagram of a web-application operating environment before migration to a cloud-computing service environment.

FIG. 1 illustrates an example of a web application operating environment. A web application (or "Web App") is a client-server computer program that the client typically runs in a web browser. In the example of FIG. 1, the client 101 includes a user device such as, for example, a person computer, a tablet computer, or a smart phone. The web application software is launched on the client 101 and connects to a web server 103, for example, through the Internet. The web application software operating on the client 101 also provides the user interface for the web application (for example, a web page displayed in the web browser of the client device). The web server 103 stores additional code and data that interacts with the web application code executed by the client 101 to provide the functionality of the web application.

The web application in the example of FIG. 1 also includes multiple different Web Parts 105. A web part 105 is a reusable component that contains or generates web-based content such as XML, HTML, and scripting code. It has a standard property schema and displays that content in a cohesive unit on a webpage (i.e., the user interface of the web application displayed on the client 101). At least some of the web parts 105 interact with the web application code on the client 101 to cause content to be displayed on the user interface. For example, one web part 105 may include software for a "search box" that is displayed on the web page user interface of the web application and another web part 105 may include software for a "display pane" configured to show content (e.g., text, video, images, etc.) on the web page user interface of the web application. In some implementations, the web application is configured to cause the web parts 105 to interact with other web parts 105. For example, the web application software may be configured to cause a "search box" web part 105 to interact with a "display pane" web part 105 such that the content shown in the "display pane" web part 105 is adjusted or changed based on search text entered by a user through the "search box" web part 105.

Although the example of FIG. 1 shows only a single client 101 and a single web server 103, in some implementations, the web application can be distributed across many clients and many web servers. For example, some of the individual web parts 105 of the web application may be stored or executed on different web servers. Furthermore, in some implementations, many different clients may be configured to run the web application and to interact with the same web server(s) 103. Also, because at least a part of the web application software is executed locally by the client 101, the appearance and functionality (i.e., "look-and-feel") of the web application can be influenced by local alterations and customizations to the web application software including, for example, local meta data.

In contrast, a cloud-computing environment is one in which software applications are executed by "virtual machines" based on on-demand availability of computer system resources (e.g., data storage and computing power). When a software application in a cloud computing environment is accessed by a user on a client computer system (e.g., client 101), the application software is generally not stored or executed locally on the client 101. Instead, the application software is executed by cloud computing resources (i.e., a cloud computing service) and the local client 101 operates only as a user interface for displaying data and receiving user inputs.

Moving a software application from a web application operating environment to a cloud-computing environment is complicated, for example, by the existence of multiple different components stored and executed on multiple different computing devices. Furthermore, because the web application software is executed locally on the client 101 and its appearance and functionality can be adjusted/customized by local modifications (e.g., metadata), it is difficult to ensure that a web application will have the same look-and-feel after migration to a cloud-computing environment.

Figure 2A:
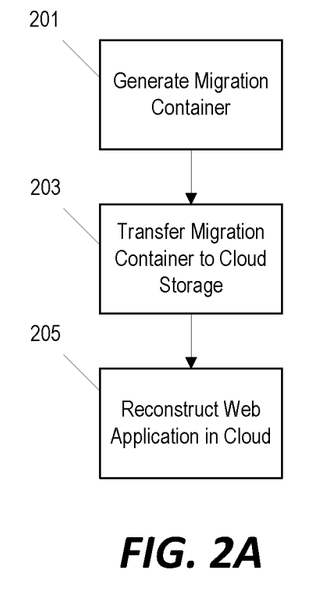
FIG. 2A is a flowchart of a method for migrating a web application from the web application operating environment of FIG. 1 to a cloud-computing service environment.

FIG. 2A illustrates a three-step method for migrating a web application from a source environment (e.g., the web application operating environment of FIG. 1) to a cloud-computing service environment (e.g., a "cloud service"). First, a migration container is generated (step 201). As described in further detail below, the migration container includes all of the web parts for the web application and a manifest defining the appearance and functionality of the web application and defining how the web part interact with each other and with the user interface. The migration container is then transferred to a cloud storage (step 203) and the cloud service accesses the migration container to reconstruct the web application in the cloud-computing environment (step 205).

Figure 2B:
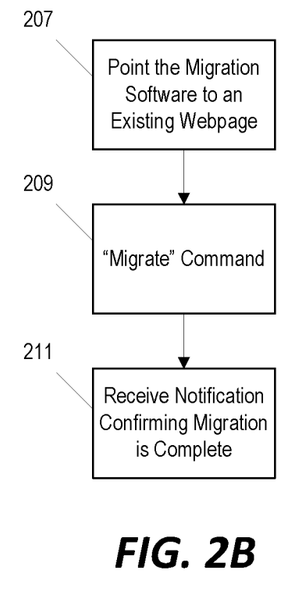
FIG. 2B is a flowchart of a user interface method for initiating and performing the method of FIG. 2A.

In some implementations, the method of FIG. 2A is greatly simplified from the user perspective and user direction is not required to facilitate the individual steps of the migration process. In fact, in some implementations, the user and the client device are not even aware of the specific steps being performed during the migration process. Instead, as illustrated in FIG. 2B, a user points the migration software to an existing webpage (e.g., a web application operating on a server or on a local desktop) (step 207) and inputs a "migrate" commend (e.g., by pressing a "migrate" button on the user interface or by typing a command into a command-line interface) (step 209). In some implementations, no further user interaction is required to facilitate the migration process and the user simply receives a notification through the client or another user device when the migration process is complete (step 211).

Figure 3:
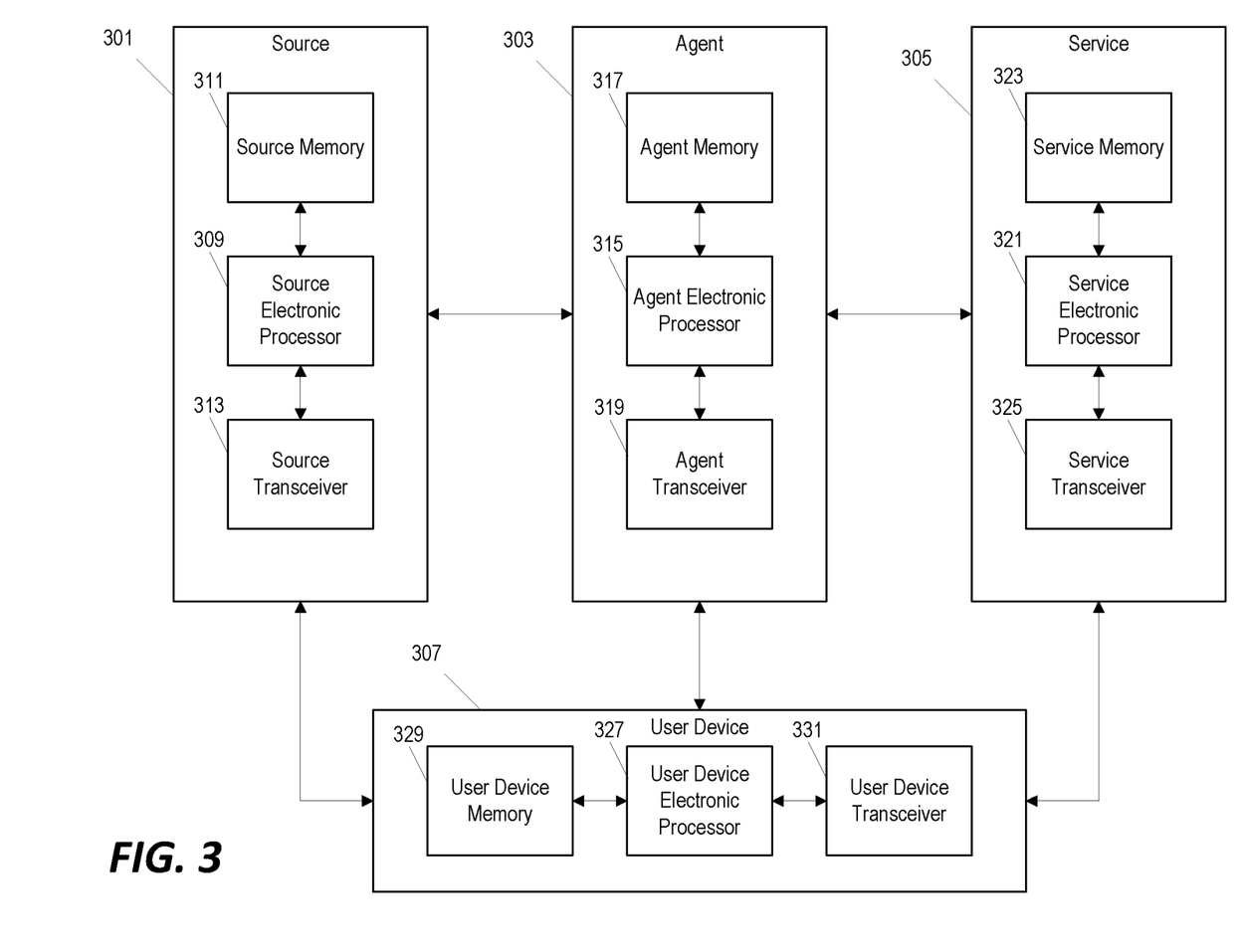
FIG. 3 is a block diagram of system components configure to interact while facilitating the migration of the web-application of FIG. 1 from the source environment to a cloud-computing service environment.

FIG. 3 illustrates various different system components that may be involved in the migration of the web application in the method of FIG. 2A including a source computer system 301, an agent computer system 303, a cloud service computer system 305, and a user device 307. The source computer system 301 includes a source electronic processor 309 and a source memory 311. The source memory 311 stores data and/or instructions that are executed by the source electronic processor 309 to provide the functionality of the source computer system 301. The source computer system 301 also includes a source transceiver 313 for wired or wireless communication with other computer systems. Similarly, the agent computer system 303 includes an agent electronic processor 315, an agent memory 317, and an agent transceiver 319; the service computer system 305 also includes a service electronic processor 321, a service memory 323, and a service transceiver; and the user device 307 includes a user device electronic processor 327, a user device memory 329, and a user device transceiver 331.

In some implementations, the user device 307 includes the client computer system that executes the web application software and provides a user interface for the web application in the web application operating environment of FIG. 1. In some implementations, the arrangement of FIG. 3 may include multiple different user devices 307 each configured to provide a user interface for and execution of the web application software. In some environments, a first user device 307 may include the client for the web application operating environment and a second user device 307 may include a different computing device through which a user initiates the web application migration process.

In some implementations, the source computer system 301 includes a web server storing one or more web parts of the web application. In other implementations, the web parts of the web application are stored on multiple different source computers. Similarly, as discussed above, a web application in the operating environment such as illustrated in the example of FIG. 1 includes software stored and executed on a client device. Accordingly, unless specified otherwise, the phrase "source computer system" as used herein refers to all of the computer devices that store or execute software code or that store content/data for a web application in its current operating environment prior to migration to the cloud service environment.

The agent computer system 303 refers to the computer device component or components that perform tasks relating to the migration operation including in some implementations, for example, generating the migration container and/or initiating an API call as discussed in further detail below. The service computer system 305 refers to the computer device component or components that performs the reconstruction of the web application in the cloud computing service environment. Accordingly, the system architecture illustrated in FIG. 3 is just one example of a system that might be configure to perform the migration operation of FIG. 2A. Other implementations may include more, fewer, or different components that contribute to or facilitate the migration process as described herein.

Figure 4:
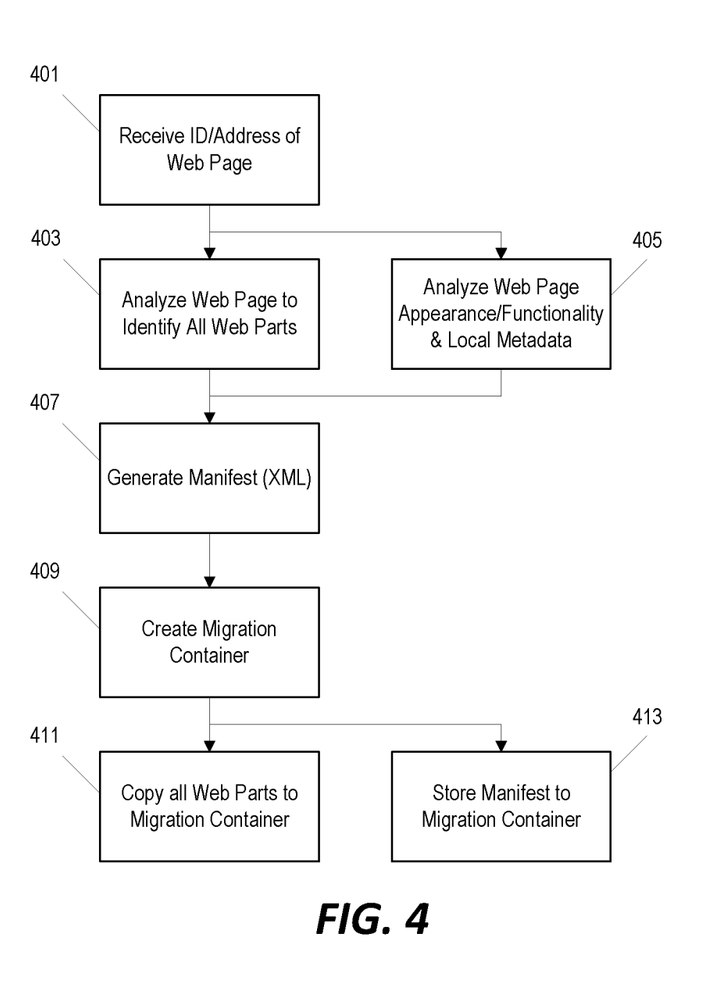
FIG. 4 is a flowchart of a method for generating a migration container to facilitate migration of the web-application of FIG. 1 to the cloud-computing service environment.

FIG. 4 illustrates an example of a method for generating a migration container for migrating a web application from a source environment to a cloud environment (e.g., step 201 in FIG. 2A). As discussed in further detail below, the method of FIG. 4 may be performed by migration software executed by the cloud-computing service system, by an agent system, by the local client system, or by the web server (e.g., source system). First, an identification of an existing web page is received (step 401). This may be provided, for example, by a user via the user interface on a client device and may be, for example, in the form of a URL. The automated software system analyzes the identified web page to identify all web parts that are included or interface with the web application associated with the identified web page (step 403). The automated software also analyzes the web page appearance & functionality as defined by the software executed by the local client computer and any additional software stored/executed by one or more web servers (step 405). The automated software also analyzes an local metadata stored on the local client that affects the appearance and/or operation of the web application.

After analyzing the existing webpage for the web application in its current operating environment, the automated software generates a Migration Manifest (step 407). The migration manifest includes a list of all of the "web parts" and any other components (e.g., software or data/content) for the web applications. The migration manifest also defines how to reconstruct the webpage to match the appearance and functionality of the web application in its current operating environment. The migration manifest is generated based on the analysis of the existing web page and any local metadata on the client computing system that affects the appearance or operation of the web application. In some implementations, the migration manifest is automatically generated as an XML document.

Figure 5:
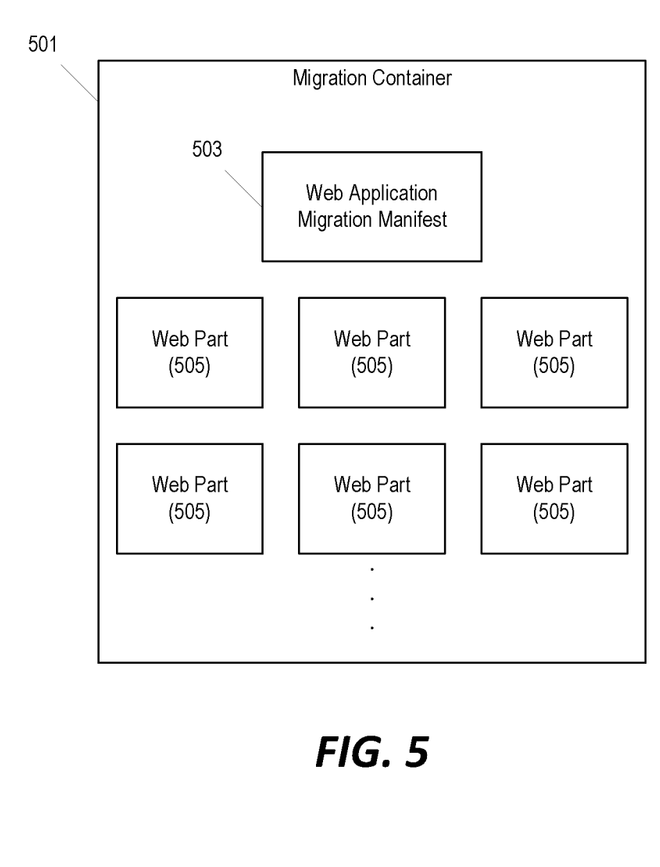
FIG. 5 is a block diagram of the migration container generated in the example of FIG. 4.

The automated software creates a migration container (step 409) that includes copies of all web parts for the web application (step 411) and a copy of the migration manifest (step 413). FIG. 5 illustrates a block diagram representation of the contents of a migration container 501 including the migration manifest 503 for the web application and copies of all of the web parts 505 and/or other software/data components for the web application.

In some implementations, the user device 307 communicates with an agent computer system 303 to initiate the creation of the migration container and the method illustrated in FIG. 4 is performed by the agent computer system 303. In other implementations, the user device 307 itself is configured to generate the migration container and, in still other implementations, the cloud-computing service computer system 305 is configured to generate the migration container in response to a received request (e.g., from the user device 307).

Figure 6:
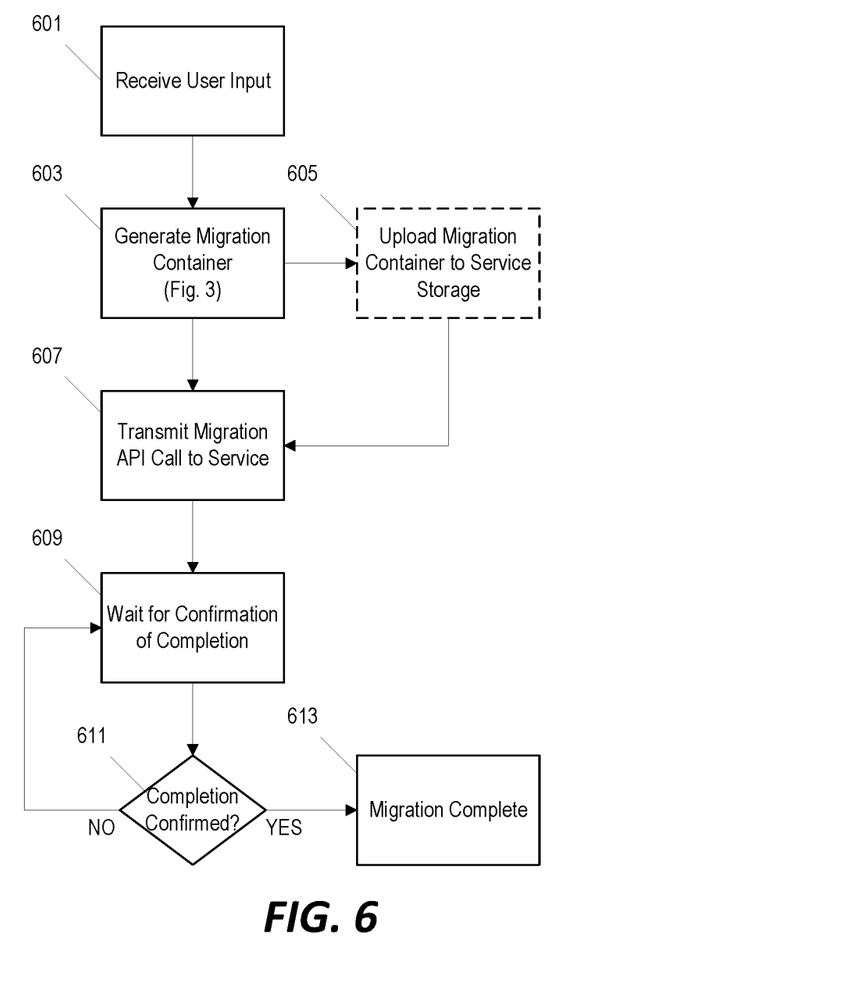
FIG. 6 is a flowchart of a method performed by the agent system of FIG. 3 to facilitate migration of the web-application of FIG. 1 to the cloud-computing service environment.

In some implementations, the agent computer system 303 both generates the migration container and initiates a migration command to the cloud-computing service computer system 305. FIG. 6 illustrates an example of one such method performed by the agent computer system 303. As discussed above in reference to FIG. 2B, a user input identifies an existing webpage of a web application (step 207) and initiates the migration process (step 209) via a user interface. In the method of FIG. 6, the agent computer system 303 receives that user input (step 601) and generates the migration container in response (step 603) (for example, according to the method illustrated in FIG. 4). In some implementations, the agent computer system 303 then uploads the migration container to a storage location accessible by the cloud-computing service computer system 305 (step 605) such as, for example, a cloud storage system or the service memory 323. The agent computer system 303 then transmits an API call to the cloud-computing service (step 607). The agent computer system 303 then waits for a response to the API call from the cloud-computing service (step 609). Once a response to the API is received from the cloud-computing service (step 611), the migration process is complete (step 613). In some implementations, the agent computer system 303 outputs a visual confirmation notice to the user interface indicating that the migration to the cloud-computing environment is successfully completed. Alternatively or additionally, in some implementations, the agent computer system 303 transmits a message confirming completion of the migration through another mechanism including, for example, email or text message.

In the example of FIG. 6, the agent computer system 303 performs the generation of the migration container and transmits the API call to the cloud-computing service computer system 305. However, in other implementations, these individual steps might be performed by other computer systems. For example, in some implementations, a local user device where the web application is currently executed can be configured to serve as the "agent"—in other words, the local user device or client may be configured to generate the migration container and transmit the API call to the cloud-computing service computer system 305. In other implementations, the "agent" functionality (e.g., as illustrated in the example of FIG. 6) may be divided among multiple different computer systems. For example, the user device or client might be configured to first transmit a request to the cloud-computing service computer system 305 requesting generation of a migration container for the web application. In some such implementations, the cloud-computing service computer system 305 might be configured to automatically initiate the migration process (e.g., as discussed below in reference to FIG. 7) in response to completing the generation of the migration container. In other such implementations, the cloud-computing service computer system 305 may be configured to notify the user device or client that the migration container has been generated and then await further instructions (e.g., an API call from the user device/client) before initiating the rest of the migration process.

Figure 7:
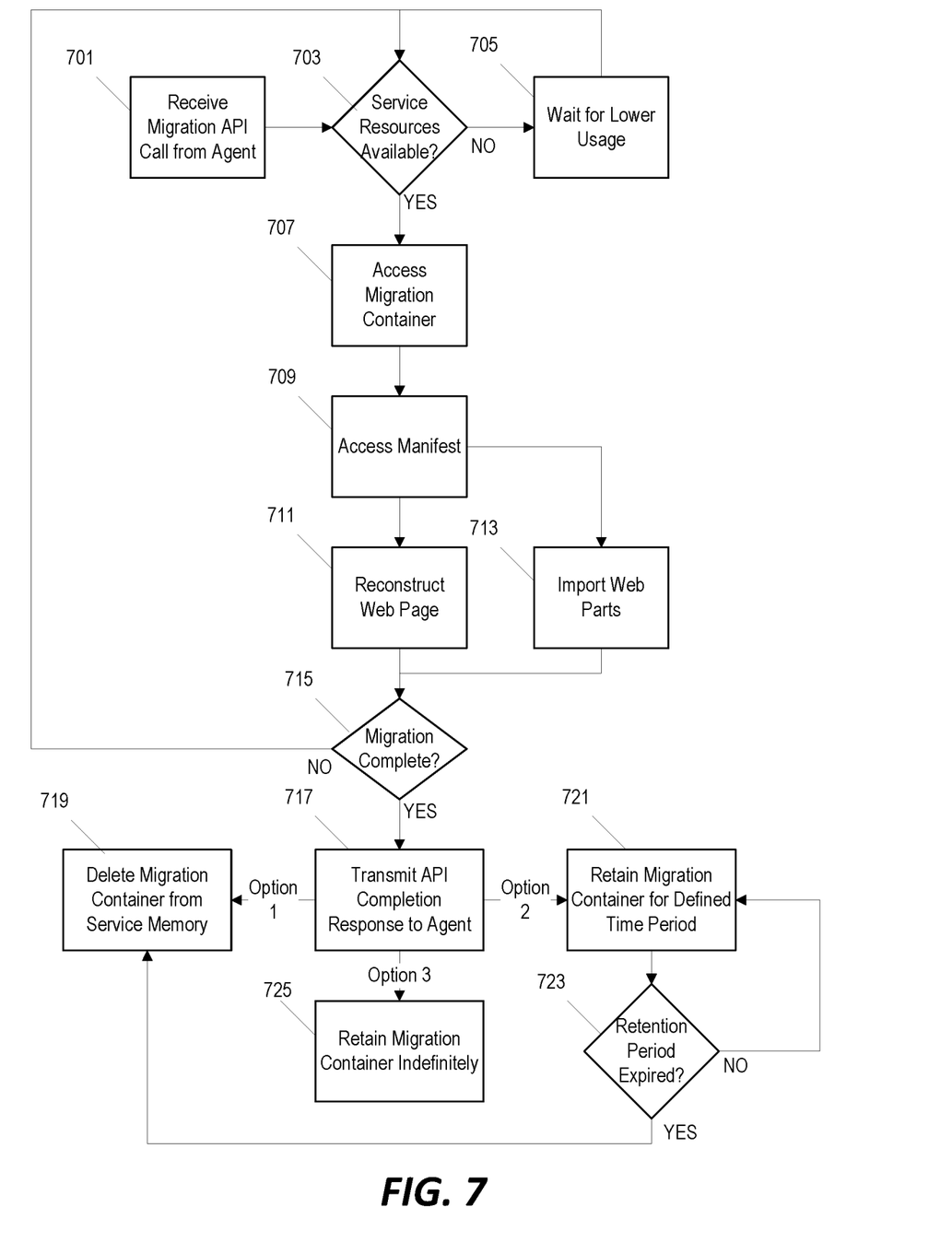
FIG. 7 is a flowchart of a method performed by the cloud-computing service to facilitate migration of the web-application of FIG. 1 to the cloud-computing service environment in response to a request received from the agent system.

FIG. 7 illustrates a method performed by the cloud-computing service computer system 305 for completing the migration of the web application to the cloud-computing environment in response to receiving the API call from the agent (i.e., step 607 in FIG. 6). In response to receiving the migration API call from the agent (step 701), the cloud-computing service computer system 305 determines whether service resources are available (step 703). In this way, the cloud-computing service computer system 305 may delay completion of the migration or may perform the migration process asynchronously in order to ensure that computing resources required for the migration process are utilized during periods of relatively low usage. If sufficient service resources are not available at the time that the API call is received from the agent (step 703), the cloud-computing service computer system 305 waits for a period of lower resource usage (step 705) before beginning the migration process.

Once the cloud-computing service computer system 305 determines that sufficient service resources are available (step 703), it accesses the migration container for the web application (step 707), for example, from a cloud storage or from another location where the migration container had been stored by the agent. The cloud-computing service computer system 305 accesses the manifest from the migration container (step 709) and begins to reconstruct the web page (i.e., the appearance and functionality of the web page) based on the information in the manifest (step 711) including importing the web parts from the migration container into the reconstructed web application in the cloud-computing environment as dictated by the manifest (step 713) and establishing interactions and connections between the web parts as dictated by the manifest. As described above, in some implementations, the migration manifest is an XML document and the cloud-computing service computer system 305 is configured to read and convert the XML of the manifest into a plurality of different elements that together recreate the web page for the web application as it appeared in the original operating environment. Also, because the migration manifest was generated based, in part, on metadata stored on one or more client devices, that metadata is preserved and reflected in the web application after migration to the cloud-computing environment. Accordingly, the appearance and functionality of the web application in the cloud-computing environment more closely matches the appearance and functionality of the web application on a particular client device in the original operating environment.

In some implementations, the migration process performed by the cloud-computing service computer system 305 (i.e., the reconstruction of the web application in the cloud-computing environment) may be automatically halted when resource usage in the cloud-computing service rises above a threshold level. In these cases, the cloud-computing service computer system 305 is configured to resume the migration process at either a specified time or in response to detecting that usage of the cloud-computing service resources has again dropped below the threshold.

After the migration process is completed by the cloud-computing service computer system 305 and the web application has been recreated in the cloud-computing environment (step 715), the cloud-computing service computer system 305 transmits a response to the API call received from the agent (step 717). The API response is transmitted to the agent and confirms that the migration of the web application to the cloud-computing environment has been completed.

In some implementations, the migration container used to facilitate the migration process is a temporary container. Accordingly, in some implementations, the cloud-computing service computer system 305 may be configured to automatically delete the migration container in response to completion of the migration process (step 719). In other implementations, the cloud-computing service computer system 305 may instead be configured to retain the migration container in cloud storage for a defined period of time (step 721) and deletes the migration container (step 719) in response to the expiration of the retention period (step 723). In still other implementations, the cloud-computing service computer system 305 is configured instead to retain the migration container in memory indefinitely (step 725). In yet other implementations, the cloud-computing service computer system 305 may be configured to automatically delete or retain the migration container based on terms selected for or by the particular user requesting the migration.

In some implementations, as described in certain examples above, the entire web application, including all of the web parts, is migrated to the cloud-computing environment in only one API call. Accordingly, the need for frequent and repeated communication between the service and the agent (or between the service and other web servers) is eliminated. This simplifies the process and greatly reduces the burden on communication resources. Furthermore, by using a migration container, the migration process is "source-agnostic." For example, because the migration manifest and all of the associated web parts for the web application are included in the migration container, the cloud-computing service computer system 305 may be configured to perform the same process for migration regardless of the original source operating environment. The migration manifest serves as the "template for creation" that is used by the cloud-computing service computer system 305 to reconstruct the web application in the cloud-computing environment.

Accordingly, the embodiments provide, among other things, systems and methods for migrating a web application from a source environment to a cloud-computing service environment using a migration container and a single API call. Various features and advantages are set forth in the following claims.

What is claimed is:

1. A method for migrating a web application from a source environment to a cloud service, the method comprising:
    accessing, by a cloud service system, a temporary container containing a manifest and a plurality of web parts for the web application, wherein each web part of the plurality of web parts is a software component that generates web-based content for the web application during operation of the web application, wherein the manifest includes a list of contents of the temporary container and defines an appearance and functionality of the web application operating in the source environment;
    reconstructing, by the cloud service system, the web application on the cloud service by automatically generating a user interface environment for the web application on the cloud service based on the manifest, and importing each web part of the plurality of web parts to the cloud service by configuring each web part and the user interface environment to interact as defined by the manifest, wherein the user interface environment on the cloud service replicates the appearance and functionality of the web application operating in the source environment;
    receiving, by the cloud service, a single API call requesting migration of the web application to the cloud service, wherein reconstructing the web application on the cloud service includes reconstructing the web application on the cloud service in response to receiving the single API call; and
    generating, by the cloud service, a response to the single API call after reconstructing the web application on the cloud service, wherein the response to the single API call confirms that the migration of the web application to the cloud service is complete.

2. The method of claim 1, wherein the manifest includes an XML file defining a functional interaction between a first web part of the plurality of web parts and a second web part of the plurality of web parts.

3. The method of claim 1, wherein the manifest includes metadata from the source environment that affected the operation of the web application in the source environment, the method further comprising automatically configuring the web application to operate on the cloud service according to the metadata from the source environment.

4. The method of claim 1, further comprising identifying one or more periods of relatively low usage of the cloud service after receiving the single API call, wherein reconstructing the web application on the cloud service includes reconstructing the web application on the cloud service asynchronously only during the one or more identified periods of relatively low usage of the cloud service.

5. The method of claim 1, further comprising: receiving an identification of an existing webpage including the web application operating in the source environment; analyzing the existing webpage operating in the source environment to identify all web parts for the web application; automatically generating the manifest based on the analysis of the existing webpage operating in the source environment; creating the temporary container; adding to the temporary container the manifest and copies of each web part listed in the manifest; and storing the temporary container to a cloud storage.

6. The method of claim 5, wherein analyzing the existing webpage operating in the source environment includes analyzing, by the cloud service, the existing webpage operating in the source environment, and wherein creating the temporary container includes creating, by the cloud service system, the temporary container.

7. The method of claim 1, further comprising deleting the temporary container after completing the reconstruction of the web application on the cloud service.

8. A web application migration system, the web application migration system comprising one or more processors, one or more memory devices and a cloud service system configured to:
    access a temporary container containing a manifest and a plurality of web parts for a web application, wherein each web part of the plurality of web parts is a software component that generates web-based content for the web application during operation of the web application, wherein the manifest includes a list of contents of the temporary container and defines an appearance and functionality of the web application operating in a source environment;
    reconstruct the web application on the cloud service by automatically generating a user interface environment for the web application on the cloud service based on the manifest, and importing each web part of the plurality of web parts to the cloud service by configured each web part and the user interface environment to interact as defined by the manifest, wherein the user interface environment on the cloud service replicates the appearance and functionality of the web application operating in the source environment;
    receive a single API call requesting migration of the web application to the cloud service, wherein the cloud service system is configured to reconstruct the web application on the cloud service in response to receiving the single API call;
    generate a response to the single API call after reconstructing the web application on the cloud service, wherein the response to the single API call confirms that the migration of the web application to the cloud service is complete.

9. The web application migration system of claim 8, wherein the manifest includes an XML files defining a functional interaction between a first web part of the plurality of web parts and a second web part of the plurality of web parts.

10. The web application migration system of claim 8, wherein the cloud service system is further configured to: receive an identification of an existing webpage including the web application operating in the source environment; analyze the existing webpage operating in the source environment to identify all web parts for the web application; automatically generate the manifest based on the analysis of the existing webpage operating in the source environment; create the temporary container; add to the temporary container the manifest and copies of each web part listed in the manifest; and store the temporary container to a cloud storage.

11. The web application migration system of claim 8, further comprising an agent system, wherein the agent system is configured to: receive an identification of an existing webpage including the web application operating in the source environment; analyze the existing webpage operating in the source environment to identify all web parts for the web application; automatically generate the manifest based on the analysis of the existing webpage operating in the source environment; create the temporary container; add to the temporary container the manifest and copies of each web part listed in the manifest; and transmit the temporary container to the cloud service system.

12. The web application migration system of claim 8, wherein the cloud service system is further configured to delete the temporary container in response to completing the reconstruction of the web application on the cloud service.

13. The web application migration system of claim 8, wherein the cloud service system is further configured to delete the temporary container in response to an expiration of a defined period of time.

* * * * *